No. 701,174. Patented May 27, 1902.
C. V. DRYSDALE.
APPARATUS FOR TESTING THE MAGNETIC QUALITIES OF MATERIALS.
(Application filed Feb. 24, 1902.)
(No Model.)
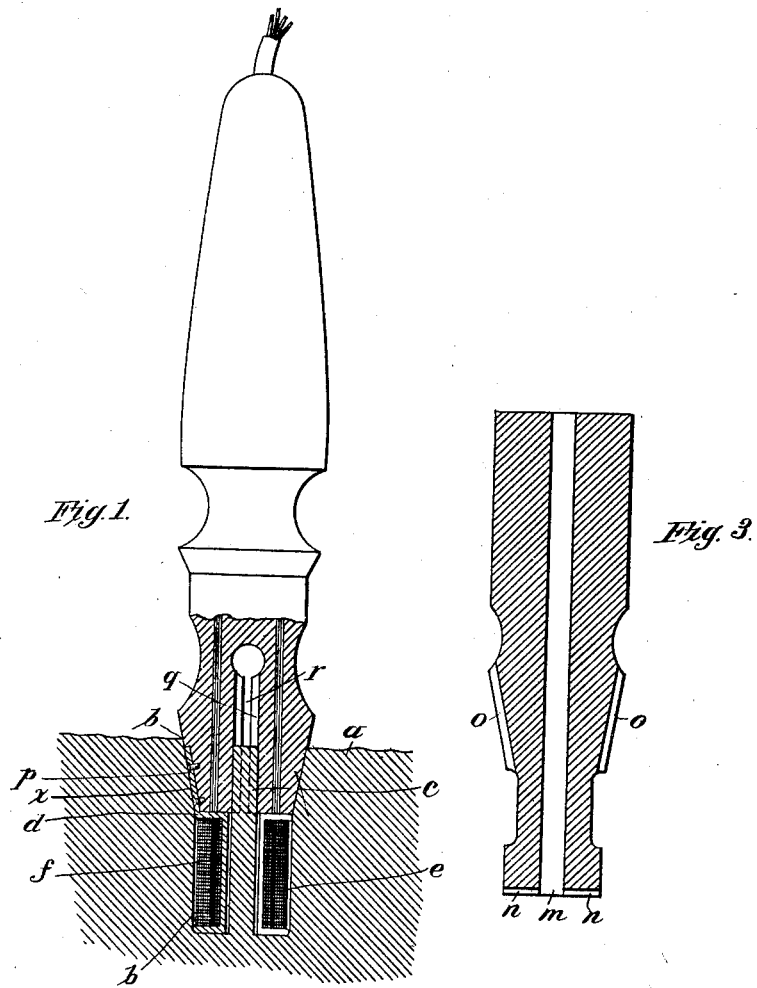
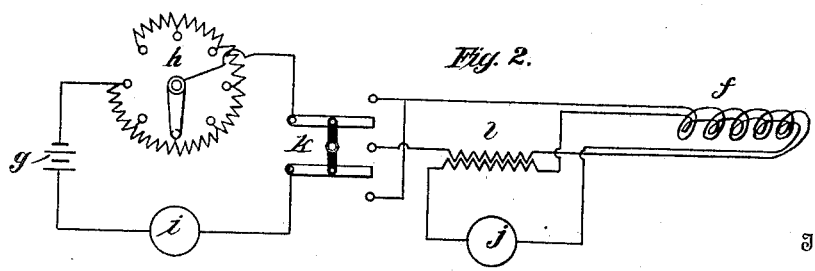
Witnesses
A. M. Parkins
J. A. MacDonald
Inventor
Charles V. Drysdale
By Baldwin Davidson Wight
his Attorneys

UNITED STATES PATENT OFFICE.

CHARLES V. DRYSDALE, OF NEW BARNET, ENGLAND.

APPARATUS FOR TESTING THE MAGNETIC QUALITIES OF MATERIALS.

SPECIFICATION forming part of Letters Patent No. 701,174, dated May 27, 1902.

Application filed February 24, 1902. Serial No. 95,409. (No model.)

*To all whom it may concern:*

Be it known that I, CHARLES VICKERY DRYSDALE, a subject of the King of Great Britain, residing at New Barnet, in the county of Hertford, England, have invented certain new and useful Improvements in Apparatus for Testing the Magnetic Qualities of Materials, of which the following is a specification.

My invention relates to the testing of the magnetic qualities of iron and other materials; and the object of my invention is to provide an apparatus which will enable me to make the required test from the actual casting or forging, as by so doing I am enabled to determine the acceptance or rejection of any specimen before the expense of machining the specimen has been incurred.

In the accompanying drawings, Figure 1 shows a section of a specimen of material with my apparatus applied, the apparatus being shown partly in section and partly in elevation. Fig. 2 is a diagram of my apparatus, showing particularly the circuit connections. Fig. 3 shows in longitudinal section one form of drill or cutter which may be employed for boring a hole in the material to be tested to receive my apparatus.

In carrying out my invention at any suitable part of the casting or forging $a$—it may be a special ear or lug formed on the specimen for that purpose—I produce an annular opening $b$, preferably flaring at the top, as indicated at $p$, and having a central core $c$ of the material standing centrally within it. This portion $c$ of the material forms the core over which a bobbin $d$ is passed. On this bobbin $d$ are wound two coils of insulated wire $e$ and $f$, the former serving as a magnetizing-coil and the latter as a search-coil. As shown in the diagram Fig. 2, the magnetizing-coil $e$ may be connected in series with a battery $g$, a resistance $h$, and an ammeter $i$, while the leads of the search-coil $f$ are connected to a galvanometer $j$. $k$ is a reversing-switch, the operation of which is well understood. Fig. 2 shows the circuit of the magnetizing-coil $e$ open; but it may readily be closed by the switch. Fig. 2 is merely a diagram.

All the appliances shown may conveniently be included in any suitable portable case.

The magnetizing-coil $e$ is employed to magnetize the core $c$. The function of the search-coil $f$ is to show the intensity of the field produced in the material under test by a given magnetizing force, such intensity being measured by the value of the current induced therein as a result of its coils cutting lines of force, the number of which vary with the intensity of such field. In order that this value may be ascertained, the search-coil is provided with a ballistic galvanometer $j$. When the switch $k$ is in proper position, the current will flow from the battery $g$ through resistance $h$, around the magnetizing-coil $e$, and through the ammeter $i$, and on making, breaking, or reversing this current an induced current will flow through the galvanometer $j$, whereon deflections will be obtained which are proportional to the magnetization of the specimen.

In order to make the instrument direct reading, the scale of the ammeter $i$ may be calibrated so that it reads the values of the magnetizing force in gausses. In the same way the scale of the galvanometer $j$ may be calibrated so as to read the values of the magnetic induction density directly. The permeability is then obtained, if necessary, by dividing the latter value by that of the former; but it is generally sufficient to compare the values of induction obtained with that obtained with some satisfactory specimen under the same conditions.

In most cases of ordinary commercial testing it would probably be sufficient to know the value of the permeability for one value of the magnetizing force. In that case the arrangement might be simplified by withdrawing the resistance $h$ and ammeter $i$ and simply arranging for the battery to give one definite current. The divisions on the galvanometer $j$ may then be marked directly with values of the permeability.

In Fig. 2, $l$ represents a compensating coil, provided for the purpose of eliminating any error due to the fact that owing to the gap that exists between the search-coil $f$ and the core $c$ said coil cuts more lines of force than pass through the said core. This compensating coil consists of a few turns of wire of each of the circuits wound together around a bobbin. The annular opening $b$ may be produced by any suitable appliance; but a very suitable form of drill or cutter for that purpose is illustrated in Fig. 3. The cutter may be used in a drilling-machine, or it may be driven by any other convenient means. It has the same contour as the hole it is adapted to cut, and it is provided with a central opening $m$, which extends a considerable distance through the cutter. It has two annular cutting-surfaces, one $n$ at its end and a conical one $o$ for the purpose of giving to the opening $b$ a taper or flare.

In Fig. 1 the plug, by means of which the apparatus is connected with the material to be tested, is shown as having a conical portion fitting the conical or tapered opening produced by the cutting-surface $o$ of the drill. $q$ is a central bore in the plug, up which the core $c$ passes when the plug is inserted. The plug is slit at $r$, so that the parts may be brought into intimate contact with each other when the conical portion of the plug engages the corresponding wall of the annular opening $b$. The plug is preferably made of iron or steel and is preferably of the form shown. A magnetic joint is obtained by the devices described, though the same result might be obtained in other ways. At the lower end of the plug the bobbin $d$ is secured in such manner as to allow of the flexure of the sides of the plug. The bobbin is split longitudinally to prevent eddy-currents. A convenient way of securing the bobbin to the plug is to form the bobbin on one side with an upwardly-projecting extension $x$, which may be secured to the plug on one side of the slit $r$.

I claim as my invention—

1. An apparatus for testing the magnetic qualities of materials comprising a plug, a bobbin attached thereto having a central bore to receive a core formed in the material to be tested, a magnetizing-coil carried by said bobbin, devices for making and breaking the circuit of said coil, another coil carried by said bobbin, and indicating devices included in the circuit of said coil.

2. An apparatus for testing the magnetic qualities of materials comprising a plug having a tapered end and a central bore adapted to fit a hole formed in the material to be tested, and to receive a core of the material within said hole, a bobbin attached to the plug, a magnetizing-coil carried by said bobbin, another coil carried by the bobbin, and indicating devices included in the circuit of said last-mentioned coil.

3. An apparatus for testing the magnetic qualities of materials comprising a magnetizing-coil adapted to encircle a core formed on the material to be tested, a coil arranged concentrically with the magnetizing-coil, indicating devices in the circuit of said last-mentioned coil, and a compensating device connected with said coils for the purpose specified.

In testimony whereof I have hereunto subscribed my name.

CHARLES V. DRYSDALE.

Witnesses:
A. F. SPOONER,
J. S. WITHERS.